United States Patent [19]

Ohkumo

[11] Patent Number: 4,846,321
[45] Date of Patent: Jul. 11, 1989

[54] CONTROL SYSTEM FOR A CLUTCH FOR A VEHICLE

[75] Inventor: Hiroya Ohkumo, Tokyo, Japan

[73] Assignee: Fuji Jukogyo Kabushiki Kaisha, Tokyo, Japan

[21] Appl. No.: 63,242

[22] Filed: Jun. 15, 1987

[30] Foreign Application Priority Data

Jun. 18, 1986 [JP] Japan .................................. 61-141822

[51] Int. Cl.$^4$ ........................ B60K 41/02; F16D 37/02
[52] U.S. Cl. ............................... 192/0.032; 192/0.076; 192/21.5
[58] Field of Search ............... 192/0.032, 0.076, 0.096, 192/21.5, 103 R; 364/424.1

[56] References Cited

U.S. PATENT DOCUMENTS

| | | | |
|---|---|---|---|
| 4,428,467 | 1/1984 | Hiramatsu | 192/0.076 X |
| 4,457,411 | 7/1984 | Hiramatsu | 192/0.076 |
| 4,466,521 | 8/1984 | Hattori et al. | 192/0.032 |
| 4,518,068 | 5/1985 | Oguma et al. | 192/0.076 X |
| 4,660,697 | 4/1987 | Yoneda et al. | 192/0.076 X |
| 4,680,712 | 7/1987 | Sakakiyama et al. | 364/424.1 |

FOREIGN PATENT DOCUMENTS 60-37425 2/1985 Japan .

*Primary Examiner*—Rodney H. Bonck
*Assistant Examiner*—Richard M. Lorence
*Attorney, Agent, or Firm*—Martin A. Farber

[57] ABSTRACT

A system for controlling an electromagnetic clutch for a motor vehicle at starting of the motor vehicle. An actual engagement rate is obtained in dependency on speeds of a drive member and a driven member of the clutch. A desired output-input speed ratio of the clutch is obtained in accordance with load on the engine and the speed of the driven member, the output-input speed ratio representing a decreasing function of the engine load and an increasing function of the speed of the driven member. Clutch current is controlled so as to converge the actual output-input speed ratio to the desired engagement rate, thereby smoothly engaging the clutch at the start of the vehicle.

6 Claims, 8 Drawing Sheets

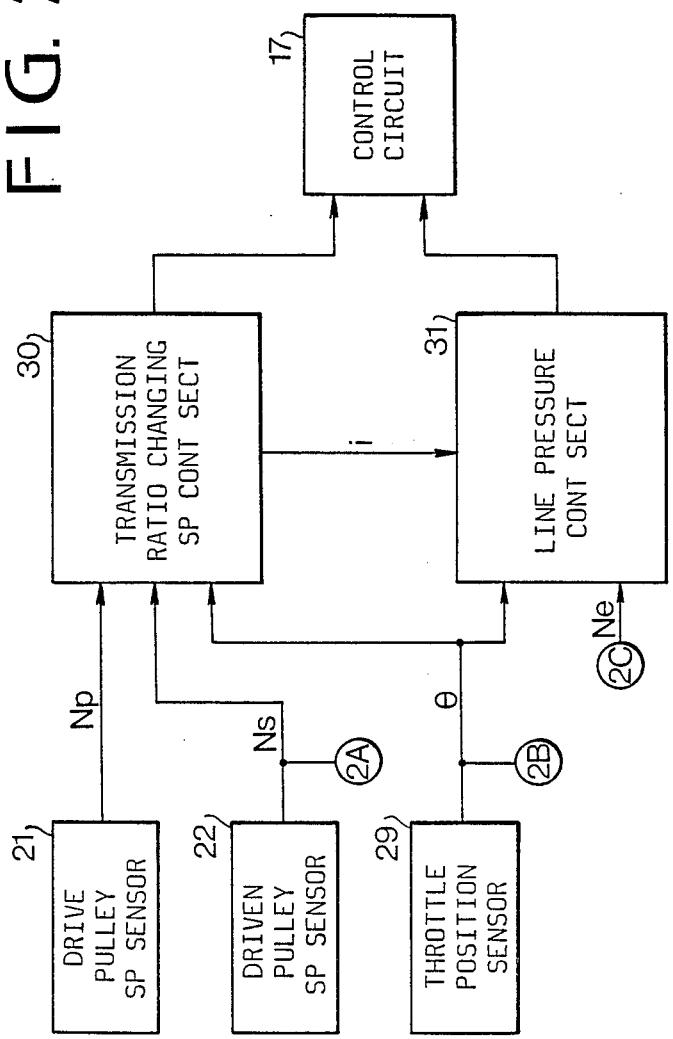

4,846,321

CONTROL SYSTEM FOR A CLUTCH FOR A VEHICLE

BACKGROUND OF THE INVENTION

The present invention relates to a control system for an electromagnetic clutch for a motor vehicle.

An automobile provided with a continuously variable belt-drive transmission with an electromagnetic clutch is disclosed in EP-A No. 151038. The electromagnetic clutch of the transmission is controlled by a control system to provide various operational modes for clutch torque (clutch current). One of the modes is selected in accordance with a position of a selector lever and driving conditions of the vehicle to control the electromagnetic clutch.

At a start of the vehicle, the clutch is controlled by the clutch torque raised in proportion to the engine speed. Slipping of the clutch at the start of the vehicle depends on the engine torque and the clutch torque. FIG. 7 shows a clutch torque curve Tc and engine torque curve Te at an opening degree of a throttle valve. The engine torque coincides with the clutch torque at a point A (stall speed Ns). Thereafter, until input speed of the clutch coincides with output speed thereof and the clutch is entirely engaged, engine speed is kept constant. However, the engine stall speed is influenced by variances in clutch torque characteristic, which are caused by manufacturing tolerances and deterioration with time, or the reduction of engine torque at high altitudes.

If the engine torque reduces, the engine stall speed Ns decreases to a lower point as A'. The vehicle starts at a small engine torque range so that the driveability decreases. If the clutch torque reduces, the engine stall speed Ns increases to a point A", which causes reduction of transmission efficiency and a rise of the temperature of the clutch.

In order to solve these problems, a control system is provided for the engagement of clutch, for example, disclosed in Japanese Patent Application Laid Open No. 60-37425. In the prior art, a desired engine stall speed is determined in accordance with the load on the engine at a start of the vehicle, and the clutch torque is controlled to coincide engine speed with the desired engine stall speed.

As shown in FIG. 8, at a start of a vehicle, the engine speed Ne increases to a point A of the desired engine speed in accordance with the engine load, remaining constant thereafter. A clutch output shaft speed Nc increases in accordance with running resistance of the vehicle or gear ratios of the transmission. When both speeds coincide with each other at a point B, the clutch is engaged. Thereafter, both speeds Ne and Nc increase together.

In such a characteristic, the increase of engine speed is rapidly stopped at the point A. Further, the engine speed is changed discontinuously at the point B. These actions cause shocks on the vehicle. Since the clutch is uniformly controlled by a predetermined engine speed, it is difficult to provide a sufficient acceleration efficiency.

SUMMARY OF THE INVENTION

The object of the present invention is to provide a control system which may improve the engagement operation of clutch at a start of a vehicle to provide an optimum acceleration efficiency.

The other objects and features of this invention will become understood from the following description with reference to the accompanying drawings.

BRIEF DESCRIPTION OF DRAWINGS

FIGS. 2a and 2b show a block diagram of a control unit according to the present invention;

DETAILED DESCRIPTION OF THE PREFERRED EMBODIMENT

Figure 1:
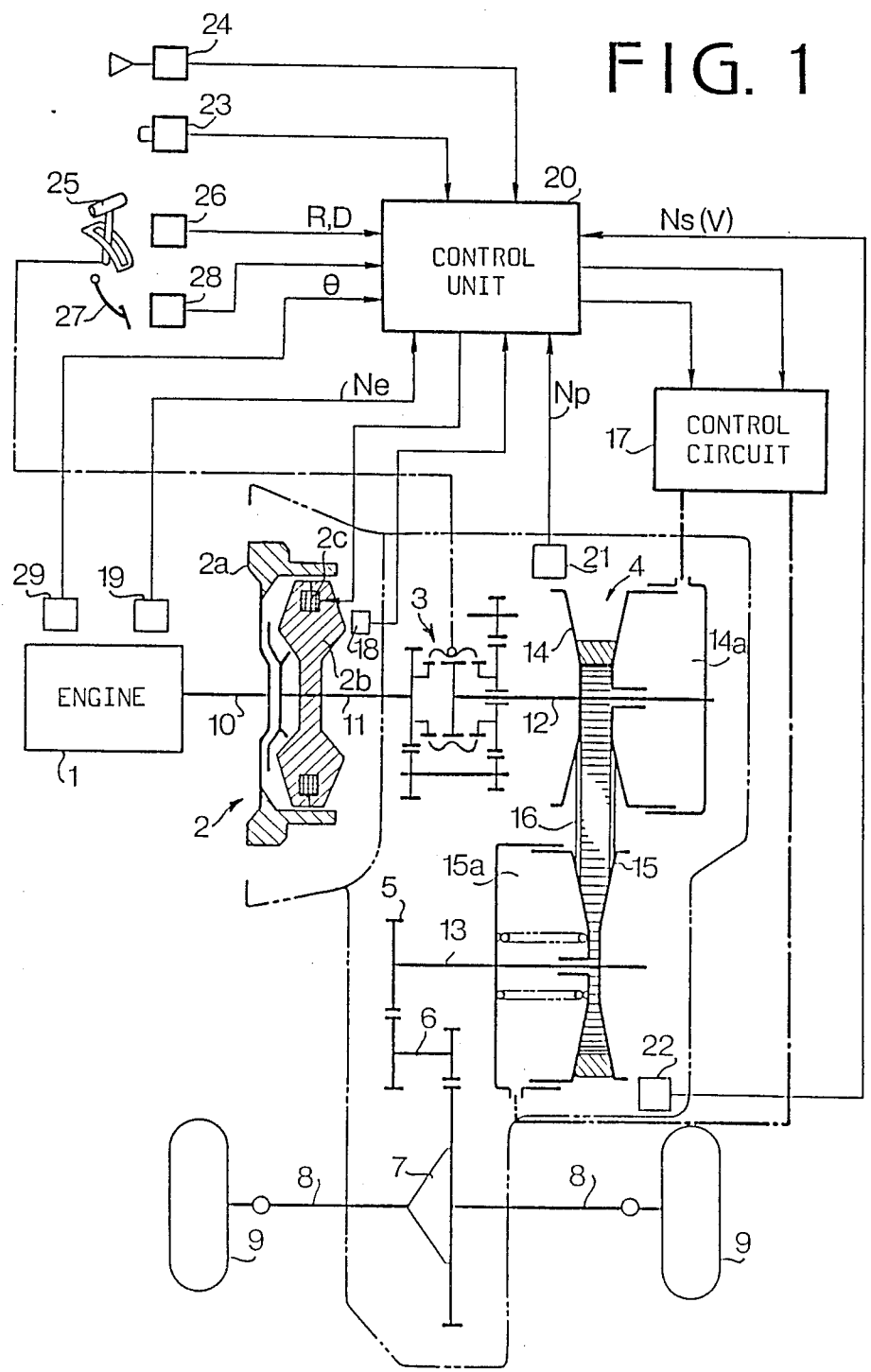
FIG. 1 is a schematic illustration of a system for controlling an electromagnetic clutch for a motor vehicle.

Referring to FIG. 1, a crankshaft 10 of an engine 1 is operatively connected to an electromagnetic powder clutch 2 for transmitting the power of the engine 1 to a continuously variable belt-drive automatic transmission 4 through a selector mechanism 3. The output of the belt-drive transmission 4 is transmitted to axles 8 of vehicle driving wheels 9 through an output shaft 13, a pair of intermediate reduction gears 5, an intermediate shaft 6, and a differential 7.

The electromagnetic powder clutch 2 comprises an annular drive member 2a connected to crankshaft 10 of the engine 1, a driven member 2b secured to an input shaft 11 of the transmission 4, and a magnetizing coil 2c provided in the driven member 2b. Powder of magnetic material is provided in a gap between the drive member 2a and driven member 2b. When the magnetizing coil 2c is excited by the clutch current, driven member 2b is magnetized to produce a magnetic flux passing through the drive member 2a. The magnetic powder is aggregated in the gap by the magnetic flux and the driven member 2b is engaged with the drive member 2a by the powder. On the other hand, when the clutch current is cut off, the drive and driven members 2a and 2b are disengaged from one another.

In the belt-drive automatic transmission 4, the selector mechanism 3 is provided between the input shaft 11 and a main shaft 12. The selector mechanism 3 is provided with a synchromesh mechanism comprising gears, hub, and sleeve for connecting the input shaft 11 and the main shaft 12 to selectively provide a driving position (D-range) and a reverse driving position (R-range).

The continuously variable belt-drive automatic transmission 4 has the main shaft 12 and the output shaft 13 provided in parallel with the main shaft 12. A drive pulley 14 provided with a hydraulic cylinder 14a is mounted on the main shaft 12. A driven pulley 15 provided with a hydraulic cylinder 15a is mounted on the output shaft 13. A drive belt 16 engages with the drive pulley 14 and the driven pulley 15. Hydraulic cylinders 14a and 15a are communicated with an oil hydraulic control circuit 17. The hydraulic control circuit 17 is responsive to vehicle speed, engine speed and throttle valve position for controlling the amount of oil supplied to the cylinders 14a and 15a. The pulleys 14 and 15 are operated by compressive forces of cylinders so that the running diameter of belt 16 is varied to infinitely change the transmission ratio.

An electronic control system for the clutch 2 and the belt-drive transmission 4 has an engine speed sensor 19, and rotating speed sensors 21 and 22 for respectively sensing speeds of drive pulley 14 and the driven pulley 15. A choke switch 24 produces an output signal when a choke valve of the engine 1 is closed, and an air conditioner switch 23 produces an output signal at the operation of an air conditioner. A selector lever 25 connected to the selector mechanism 3 is provided with a select position sensor 26 for sensing a drive position D and a reverse position R. An accelerator pedal switch 28 is provided for sensing the depression of an accelerator pedal 27, and a throttle position sensor 29 is provided. A driven member speed sensor 18 is provided on the clutch 2 at an output shaft of the driven member 2b thereof for sensing the speed of the driven member 2b.

Output signals of the sensors and pulses of the switches are applied to an electronic control unit 20 which produces a clutch current control signal to the clutch 2 and a control signal for controlling the transmission ratio (i) and a line pressure control signal to the control circuit 17.

Figure 2B:
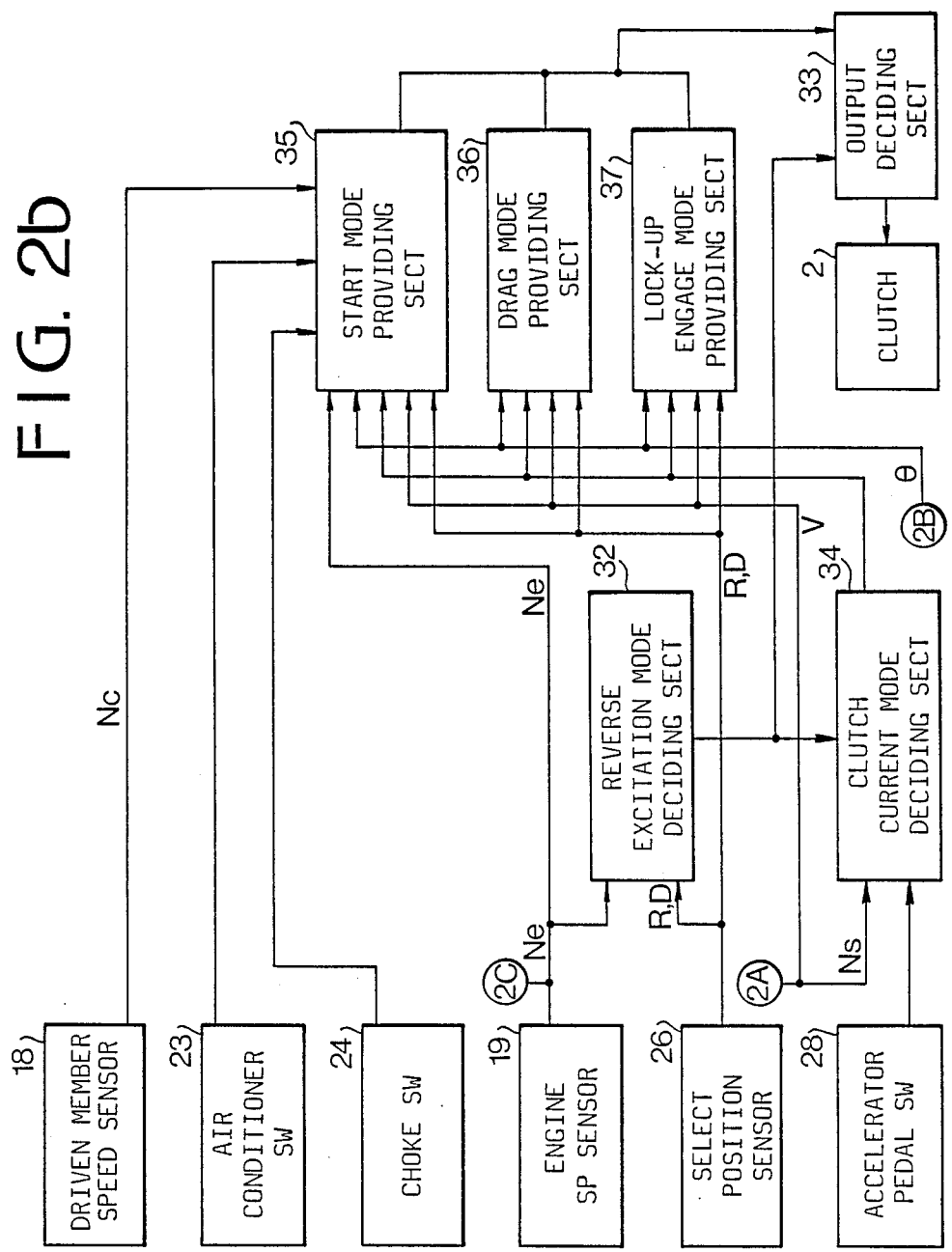

Referring to FIGS. 2a and 2b showing the control unit 20 of FIG. 1, a transmission ratio changing speed control section 30 is applied with a drive pulley speed signal $N_P$ of the sensor 21, driven pulley speed signal $N_S$ of the sensor 22, and throttle position signal $\theta$ of the sensor 29 to produce the transmission ratio control signal dependent on a desired transmission ratio changing speed (rate) di/dt. A line pressure control section 31 is applied with an engine speed signal Ne of the sensor 19, throttle position signal $\theta$ of the sensor 29, actual transmission speed ratio signal i ($N_S/N_P$) of the transmission ratio changing speed control section 30 to produce the line pressure control signal dependent on a desired line pressure. These control signals are applied to the control circuit 17 to control the transmission ratio and line pressure of the transmission 4.

A reverse excitation mode deciding section 32 is applied with engine speed signal Ne of the sensor 19 and drive position signal of the select position sensor 26. When the engine speed Ne is below 300 rpm, or the selector lever 25 is at a neutral position (N-range) or a parking position (P-range), the reverse excitation mode deciding section 32 produces a reverse excitation signal which is applied to an output deciding section 33, so that a small reverse current flows in the clutch 2 to release the clutch completely.

A clutch current mode deciding section 34 is applied with signals from the reverse excitation mode deciding section 32 and accelerator pedal switch 28, and vehicle speed signal V from driven pulley speed sensor 22 for deciding driving conditions such as starting mode to produce output signals. The output signals are applied to a start mode providing section 35, drag mode providing section 36, and clutch lock-up engage mode providing section 37.

The start mode providing section 35 decides clutch current of starting characteristic dependent on a desired output-input speed ratio of the clutch responsive to the throttle valve opening degree $\theta$ and a driven member speed Nc by the sensor 18. The starting characteristic is corrected by signals from the throttle valve opening degree $\theta$, vehicle speed V, and driving positions of D-range and R-range.

The drag mode providing section 36 decides a small drag current when the accelerator pedal 27 is released at a low speed in each drive position for providing a drag torque to the clutch 2 for the smooth start of the vehicle.

Figure 3:
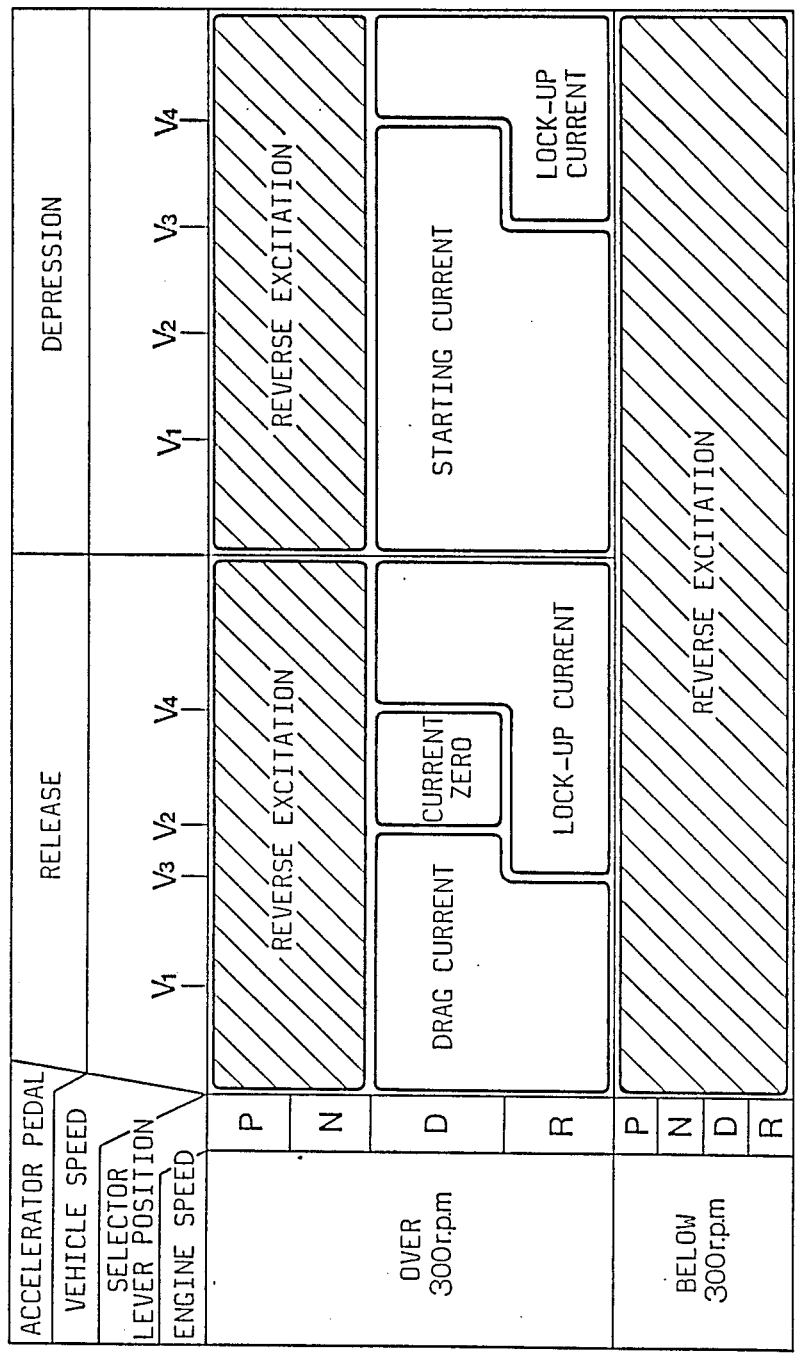
FIG. 3 is a graph showing regions of various modes.

The clutch lock-up engage mode providing section 37 decides a lock-up current in response to the vehicle speed V and throttle opening degree $\theta$ at each drive position for entirely engaging the clutch 2. Outputs of sections 35, 36 and 37 are applied to the output deciding section 33 to control the clutch current. A range of each mode is shown in FIG. 3.

Figure 4:
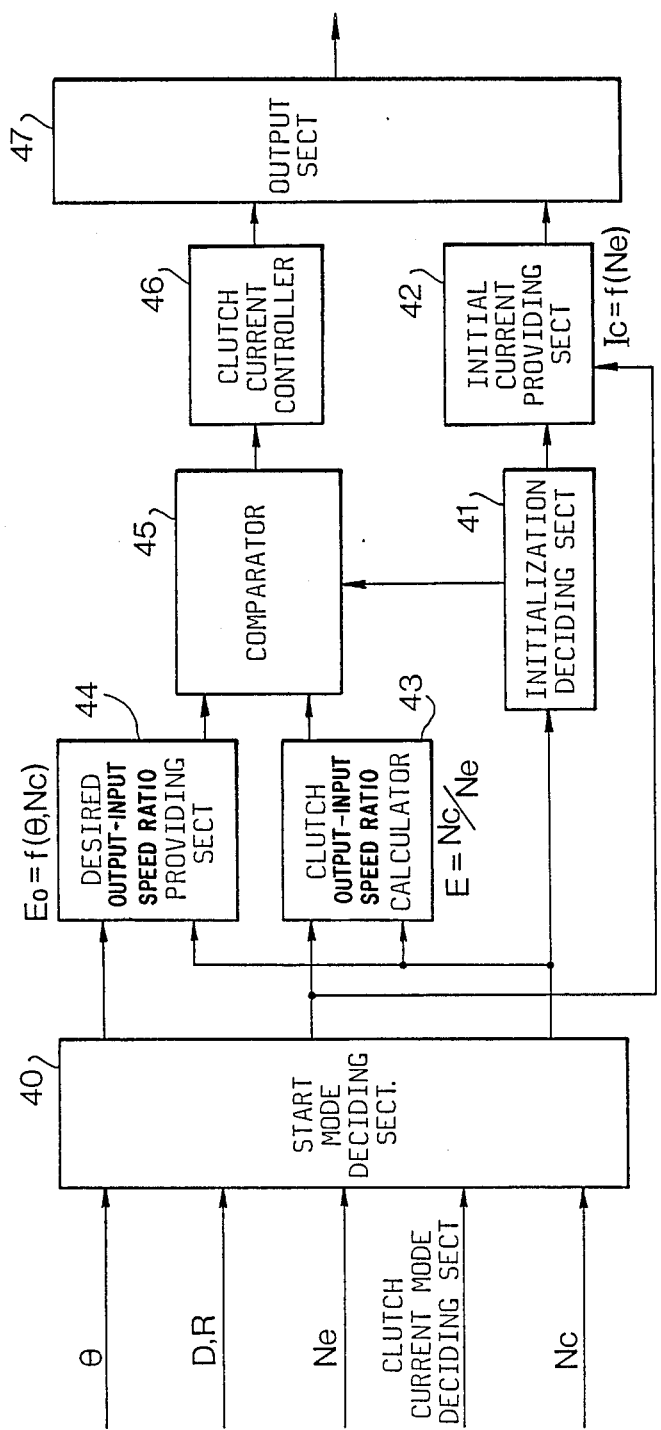
FIG. 4 is a block diagram of a main part of the system according to the present invention.

Referring to FIG. 4, the start mode providing section 35 has a start mode deciding section 40 which is supplied with output signals of the clutch current mode deciding section 34, throttle valve opening degree $\theta$, engine speed Ne, drive position R-range and D-range, and drive member speed Nc.

Signals of the engine speed Ne and the drive member speed Nc are applied to a clutch output-input speed ratio calculator 43. The calculation of the clutch output-input speed ratio E is made by $E = Nc/Ne$. Signals of the throttle valve opening degree $\theta$ and the driven member speed Nc are applied to a desired clutch engagement rate providing section 44. Desired clutch output-input speed ratio Eo are previously determined by $Eo = f(\theta, Nc)$ and stored in a look-up table. The desired clutch output-input speed ratio Eo is a decreasing function of the throttle opening degree $\theta$, and an increasing function of the driven member speed Nc. These signals E, Eo are applied to a comparator 45.

The driven member speed Nc is applied to an initialization deciding section 41 and compared with a predetermined reference speed n1 (for example, 200 rpm). When Nc=0, the clutch output-input speed ratio E becomes zero, because $Nc/Ne = 0$ irrespective of the value of the engine speed Ne. Accordingly, the engine speed Ne is not proportionated to the output-input speed ratio E. Therefore, when Nc<nl, the system is initialized to control the starting operation.

At the initialization, it is desirable that a clutch engaging force (clutch torque) corresponding to a predetermined stall speed is applied to the clutch. To this end, an initial current providing section 42 is provided. The initial current providing section 42 decides a clutch current Ic by $Ic = f(Ne)$ responsive to the engine speed Ne.

At the comparator 45, the clutch engagement rate E is compared with the desired engagement rate Eo in accordance with the signal from the initialization providing section 41. An output signal of the comparator 45 is applied to a clutch current controller 46 so as to increase or decrease the clutch current Ic.

The clutch current Ic of the section 42 and the clutch current Ic of the controller 46 are respectively applied to an output section 47.

Figure 5:
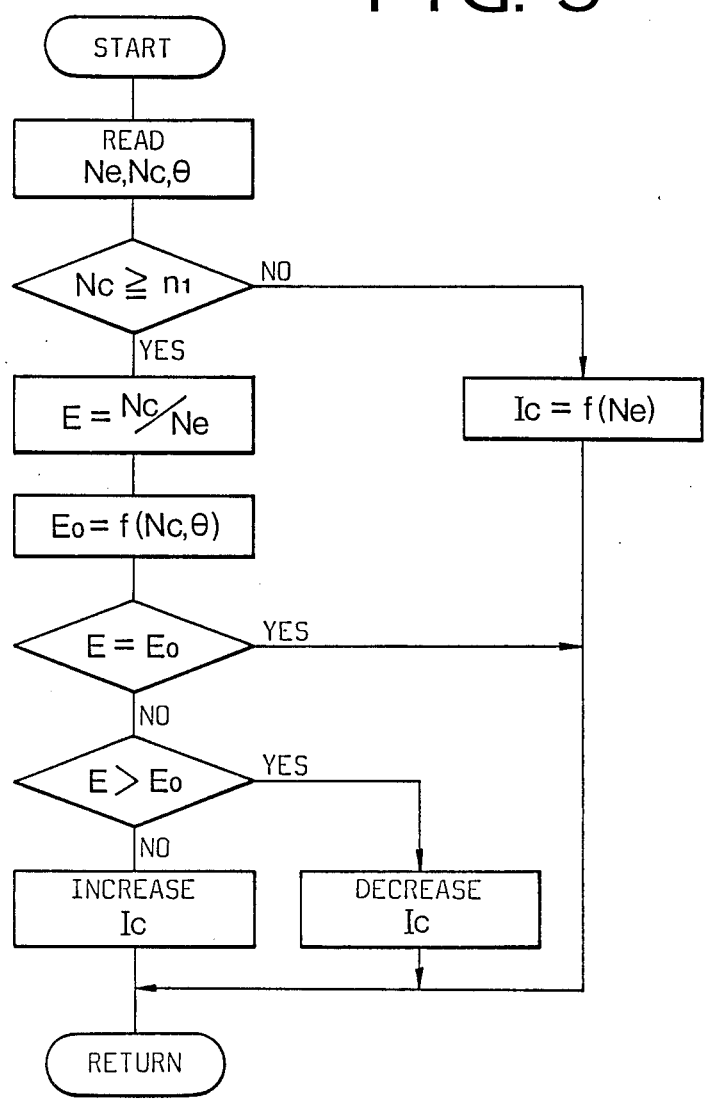
FIG. 5 is a flow chart showing the operation of the system.
Figure 6:
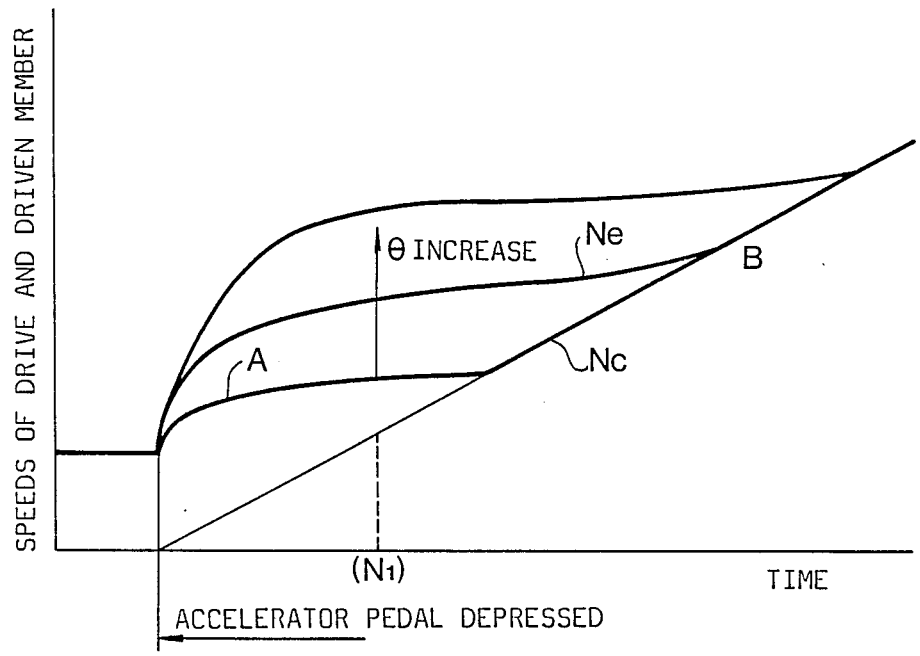
FIG. 6 is a graph showing characteristics of the system of the present invention.
Figure 7:
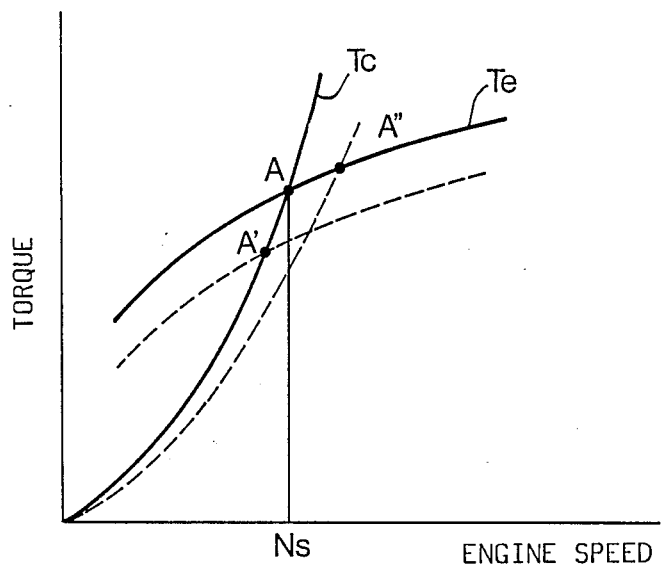
FIG. 7 is a graph showing a relationship between engine speed and torques.
Figure 8:
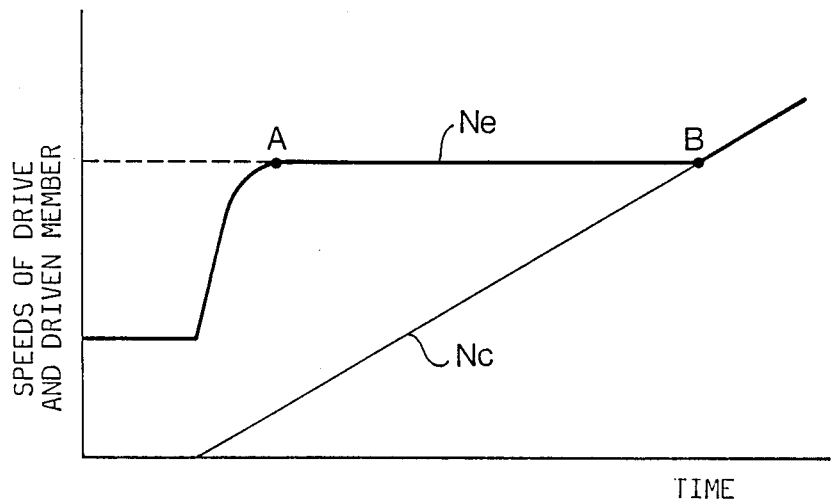
FIG. 8 is a graph showing characteristics of a conventional system.

Referring to FIGS. 5 and 6, the operation of the control system is described hereinafter. At the starting of the vehicle, when the accelerator pedal is depresssed while the select lever is positioned at D-range, the start mode providing section 35 is selected. When the driven member speed Nc is smaller than the predetermined reference value nl (Nc <nl) in the beginning of the starting, the initial current providing section 42 produces the clutch current Ic in proportion to the engine speed Ne through the initialization deciding section 41.

Thus, the output-input speed ratio E gradually increases, so that the driven member speed Nc gradually increases as shown in FIG. 6.

When Nc is equal to or larger than nl (Nc≧nl), a feedback control operation dependent on the clutch engagement rate E starts. That is, the actual output-input speed ratio E from the calculator 43 is compared with a desired output-input speed ratio Eo derived from the look-up table in the section 44 at the comparator 45, the output signal of which is applied to the controller 46. When the actual ratio E is larger than the desired ratio Eo, the clutch current Ic of the controller 46 is reduced to increase the slipping of the clutch. When the actual ratio E is smaller than the desired rate Eo, the clutch current Ic is increased to decrease the slipping. Thus, the output-input speed ratio E of the clutch 2 is controlled so as to coincide with the desired output-input speed ratio Eo by the feedback control.

Since the desired output-input speed ratio Eo is a decreasing function of the throttle opening degree $\theta$, the stall speed A increases with increase of engine load as shown in FIG. 6. Further, the desired output-input speed ratio Eo is an increasing function of the speed Nc of the output shaft of the clutch, engine speed Ne increases with increase of the speed Nc. Accordingly, the clutch is smoothly engaged at the point B, thereby decreasing the engagement shock.

The above described operation can be used in transient modes other than the starting mode. It is possible to control the clutch torque in a speed range of the speed Nc lower than the set speed nl in accordance with a condition other than the engine speed Ne, such as the opening degree of the throttle valve.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. In a control system of a clutch for transmitting power of an engine to driving wheels of a motor vehicle, comprising engine load detecting means for detecting engine load and for producing a load signal dependent thereon, input speed sensing means for sensing rotating speed of an input shaft of the clutch and for producing an input speed signal dependent thereon, and output speed sensing means for sensing rotating speed of an output shaft of the clutch and for producing an output speed signal, the improvement of the system which comprises actual ratio calculating means responsive to the input speed signal and the output speed signal for calculating an actual output-input speed ratio of the clutch, desired ratio determining means responsive to the output speed signal and the load signal for determining a desired output-input speed ratio of the clutch from a table wherein the desired output-input speed ratio represents a decreasing function of the load signal and an increasing function of the output speed signal, comparing means for comparing the actual output-input speed ratio of the clutch and the desired output-input speed ratio of the clutch, and control means responsive to the comparing means for controllng clutch engaging torque such that the actual output-input speed ratio converges to the desired output-input speed ratio so as to decrease engagement shock of the clutch.

2. The system according to claim 1 wherein the clutch is an electromagnetic clutch and the control means controls current passing in a coil of the electromagnetic clutch.

3. The system according to claim 1 wherein the load on the engine is represented by opening degree of a throttle valve of the engine.

4. The system according to claim 1, further comprising detecting means responsive to the output speed signal for detecting an initializing condition of the vehicle and for producing an initializing signal when a value of the output speed signal is lower than a predetermined value, deciding means responsive to the initializing signal for deciding a clutch engaging torque dependent on the input speed signal, and means responsive to the deciding means for producing said clutch engaging torque.

5. The system according to claim 4, wherein said clutch engaging torque is proportional to the input speed signal.

6. The system according to claim 1, wherein said actual ratio calculating means calculates said actual output-input speed ratio of the clutch by dividing the output speed by the input speed.

* * * * *